United States Patent [19]

Schubert

[11] Patent Number: 4,948,208

[45] Date of Patent: Aug. 14, 1990

[54] GUIDE OR RUNNER SYSTEMS FOR ACCOMMODATING TRANSLATIONAL MOVEMENT

[75] Inventor: Wolfgang Schubert, Lustenau, Austria

[73] Assignee: Grass AG, Hochst, Austria

[21] Appl. No.: 310,209

[22] Filed: Feb. 13, 1989

[30] Foreign Application Priority Data

Aug. 30, 1988 [DE] Fed. Rep. of Germany ....... 3829404
Oct. 11, 1988 [DE] Fed. Rep. of Germany ....... 3834581

[51] Int. Cl.⁵ ............................................. A47B 88/00
[52] U.S. Cl. .................................. 312/344.1; 312/319; 248/206.5; 335/219
[58] Field of Search ........................ 248/206.5; 49/404; 312/341.1, 344.1, 319; 310/90.5; 335/219, 285; 160/16; 16/82, 14

[56] References Cited

U.S. PATENT DOCUMENTS

3,019,070  1/1962  Diebold .................................. 312/319
3,441,331  4/1969  Kesling ............................. 248/206.5

FOREIGN PATENT DOCUMENTS

0707857  4/1965  Canada ............................. 248/206.5

*Primary Examiner*—Kenneth J. Dorner
*Assistant Examiner*—Gerald A. Anderson

[57] ABSTRACT

A guide system for a drawer comprises a mounting rail attached to a piece of furniture, a drawer rail attached to the drawer and supported and guided by the mounting rail for translational movement relative thereto.

The rails are provided with vertically superimposed, longitudinally extending magnetic tracks of the same polarity which repel each other and maintain a magnetic air gap therebetween, so that the magnetic repelling forces are load-bearing and maintain the drawer in a suspended condition. Lateral guide means are provided to maintain the vertical alignment of the superimposed magnetic tracks.

The magnetic load-bearing tracks may be formed from permanent magnets or electromagnets.

8 Claims, 10 Drawing Sheets

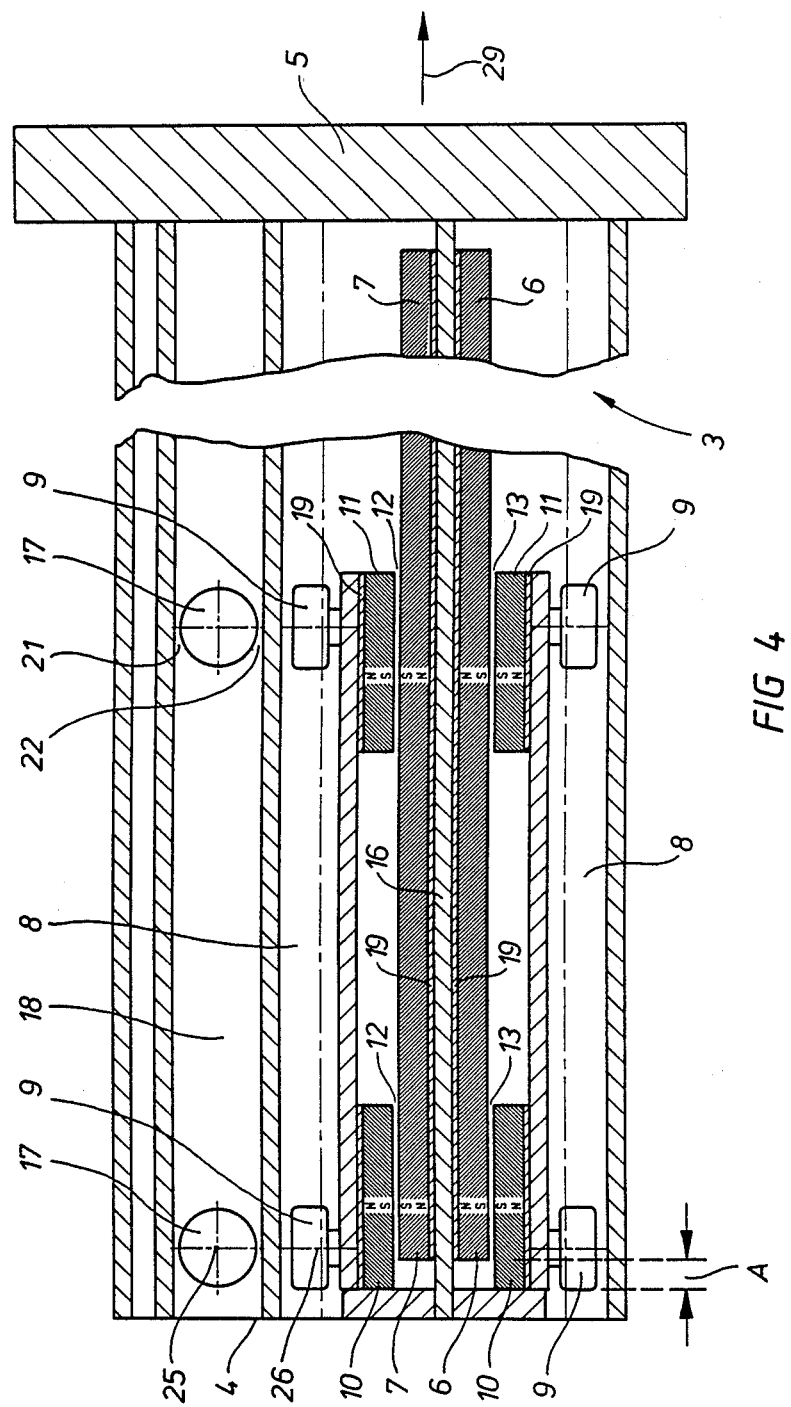

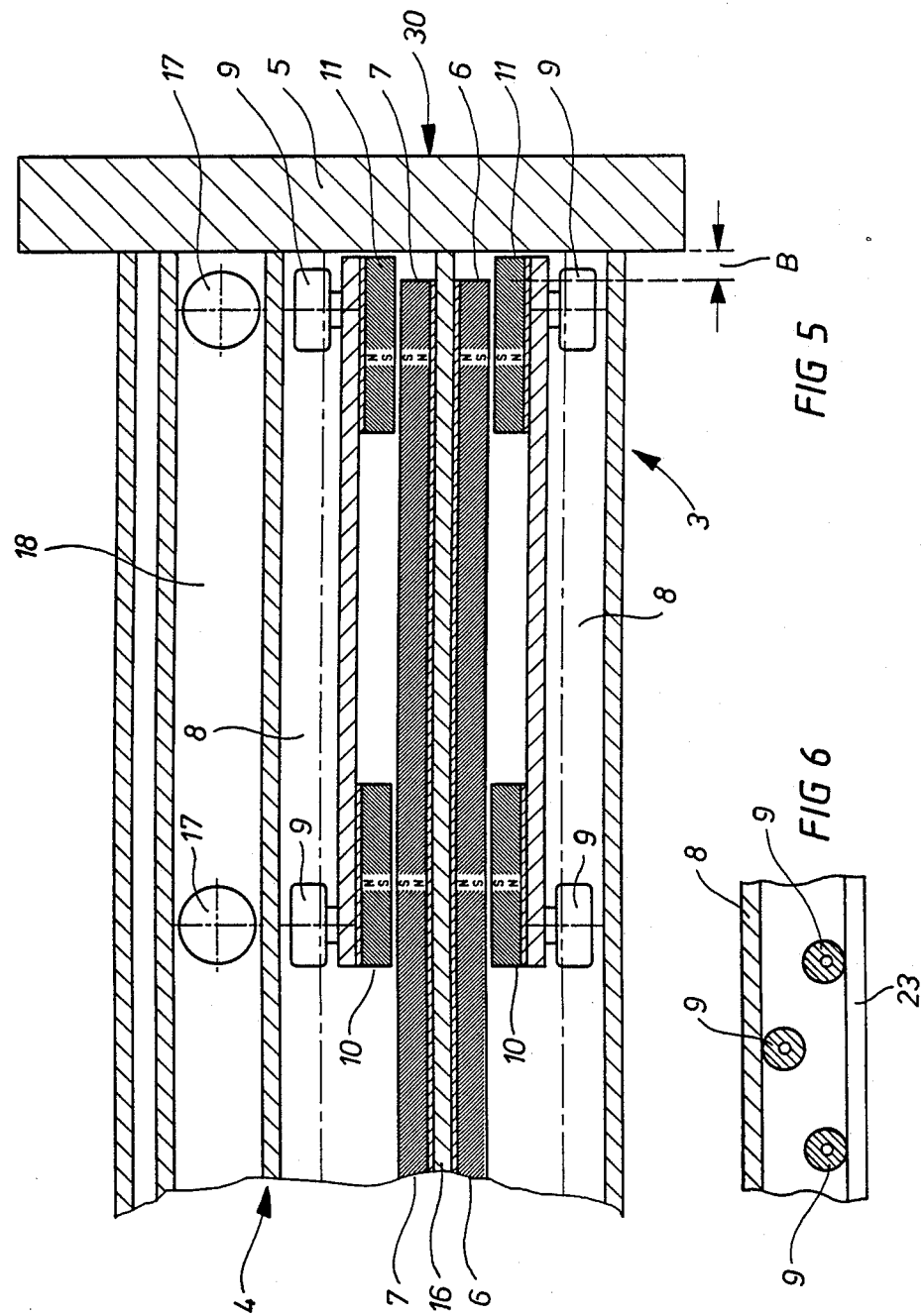

GUIDE OR RUNNER SYSTEMS FOR ACCOMMODATING TRANSLATIONAL MOVEMENT

BACKGROUND OF THE INVENTION

The present invention relates to guide or runner systems for accommodating translational movement between two structures, one of which supports the other, for example between a movable drawer and a stationary body of a piece of furniture. The system includes a runner or track such as a stationary mounting rail associated with the stationary structure, and a carriage such as a slider or rail associated with the movable structure, the movable rail being supported on, running on, and being guided by, the mounting rail.

Guide systems of this type have numerous applications, and may be utilised not only for drawers, but also for sliding trays, extending devices or the like. Such structures are provided with pairs of guide rail assemblies, each comprising a mounting rail and a movable rail. Such guide systems, as applied to drawers, may be used with drawers which may be pulled out in a normal manner to a limit position, or may be completely withdrawn; with lateral and under-base drawer installations; or with drawers constructed as sashes, frames or the like, etc.

In known guide systems of this type, a drawer is provided with a bottom and a front or facing panel, as well as with lateral drawer rails, and guide or mounting rails are installed on the body of the piece of furniture. Whilst the drawer is being pulled out or pushed in it is supported via guiding and running rollers which roll along corresponding track surfaces of the drawer rails or mounting rails. Such a system possesses the disadvantage that the drawer cannot be moved precisely and in a effectively friction-free manner, when it is being pulled out or pushed in. Furthermore, a considerable amount of noise is generated by the rollers as they run along their track surfaces.

It is an object of the present invention to provide a guide system for a movable structure, such as a drawer or the like, by means of which the drawer may be moved in a manner which is as precise and free from friction as possible, whilst minimising or effectively eliminating annoying running noise which would otherwise occur during operation of the drawer.

It is also an object, in one embodiment of the invention, to provide a system in which drawer-closing and opening forces are created as the drawer nears its terminal positions.

BRIEF SUMMARY OF THE INVENTION

According to one aspect of the invention, the mounting rail or runner has a recess or cavity into which at least one limb of the drawer rail or carriage projects, magnets of opposite polarity, operable to transmit the drawer load and arranged opposite one another, being provided in the vicinity of gaps within the recess and on the limb of the drawer rail.

The essence of the invention is that the drawer is continuously supported in a floating condition by the magnets, for example permanent magnets, particularly when the drawer is under load. Supplemental guide rollers may optionally be provided, for example on the mounting rail and engaging with a track associated with the drawer rail, merely to prevent lateral displacement of the drawer. The drawer is continuously maintained in suspension and its lateral guide tracks bear on the guide rollers without any significant load, thereby largely eliminating running noise.

Due to the suspended positioning of the drawer on a magnetic bearing system comprising permanent magnets and intervening air gaps, the latter air gaps effectively prevent frictional contact between the rails, so that a virtually frictionless operation of the drawer is assured in combination with the guide rollers.

In one advantageous embodiment, overload rollers rotatable about generally horizontal axes are provided on one rail, for example the mounting rail, which engage in a supporting channel of the drawer rail with a clearance. The overload rollers merely act as a safety device in case the drawer is overloaded, the drawer rail then advantageously resting on the overload rollers so that the drawer can still function, supported by the overload rollers, without damaging the magnetic system.

The permanent magnets associated with or forming the movable drawer rail may advantageously take the form of an uninterrupted magnetic track.

The permanent magnets associated with or forming the stationary mounting rail may take the form of mutually opposed strip-like bearing magnets, such as magnetic strips of alternating polarity which are arranged close to one another. This produces a multiplication of the resultant magnetic force.

The permanent magnets may comprise elongate strips of a plastics material with ferromagnetic particles embedded therein, which are made or arranged in alternately polarised strip form. These strip-like magnetised plastics strips or webs may be easily installed, and ensure that the magnetic force flux along the entire length of the drawer is effectively constant.

The permanent magnets may rest on, or be mounted via, soft iron pole pieces or plates. The lines of magnetic force are advantageously closed or concentrated by these plates. The plates also give rise to a screening action.

In another embodiment, three or more mutually offset guide rollers are provided which engage within a channel shaped lateral guide track. With this configuration, the guide rollers run almost without clearance against opposite side walls of the track ensuring that the superimposed strip-like magnet assemblies on opposite sides of the air gaps are always maintained with their like, mutually repelling poles in vertical and longitudinal alignment, thereby obtaining a high degree of efficiency.

In another advantageous embodiment, the magnetic tracks associated with the drawer are arranged to be longitudinally offset relative to the mounting or bearing magnets associated with the body of the piece of furniture when the drawer is in, or nearly in, its terminal positions, i.e. when the drawer is almost fully pushed in or pulled out. By this means magnetic closing and opening forces are respectively applied to the drawer at its terminal positions. Upon pushing in the drawer, the latter is drawn in automatically as it approaches but before it reaches the terminal closed position. Upon withdrawing the drawer, the extracting action is assisted by the magnetic opening force as the drawer approaches the terminal open position.

Provision is made, in another embodiment, for other permanent magnets having horizontally directed bearing and guiding forces to be incorporated in addition to the permanent magnet system having the vertically directed bearing and guiding forces. These other permanent magnets are provided between the mounting rail and the drawer rail to laterally locate the floating drawer, so that the previously described supplemental lateral guide rollers may be omitted.

Optional combinations of guide systems are encompassed by the present invention and in particular the following systems:

Load-transmitting mutually opposed magnetic tracks associated with the drawer and mounting guide rails may be combined with overload rollers or sliders. An overload which might possibly occur during operation would then be absorbed by these overload rollers or sliders.

Appropriate anti-friction coatings may be provided on the magnetic tracks, instead of providing the aforementioned sliders or rollers. Anti-friction coatings of this nature may be produced by combining different materials, for example a "Teflon" coating may be applied to one magnetic assembly or track, whereas a polished metal or plastics surface may be provided on the magnet assembly or track opposite the "Teflon" coated track. Such guide systems may, for example, be triple-roller systems, rolling element bearings, friction bearings or the like. In this respect, known guide systems may be provided for laterally guiding the drawer.

Instead of producing the lateral guiding action by means of known guide systems, use may be made of mutually opposed, mutually repelling magnetic tracks for the purpose of lateral guiding.

The combination of the magnetic tracks proposed in accordance with the invention with adjacent guides which are installed beneath the bottom of the drawer, is also within the scope of the present invention, as are telescopic full withdrawal systems.

BRIEF DESCRIPTION OF THE DRAWINGS

Further objects, features and advantages of the present invention will become apparent from the following description taken in conjunction with the accompanying drawings, which illustrate various non-limiting examples. In the drawings:

FIG. 4 is a fragmentary longitudinal section, with the drawer open, along the line IV—V of FIG. 3;

FIG. 5 is a fragmentary section, similar to FIG. 4, but with the drawer closed, along the line V—V of FIG. 3;

FIG. 6 is a fragmentary longitudinal section through another embodiment showing the installation of guide rollers in a lateral guide track;

DETAILED DESCRIPTION OF THE PREFERRED EMBODIMENTS

Figure 1:
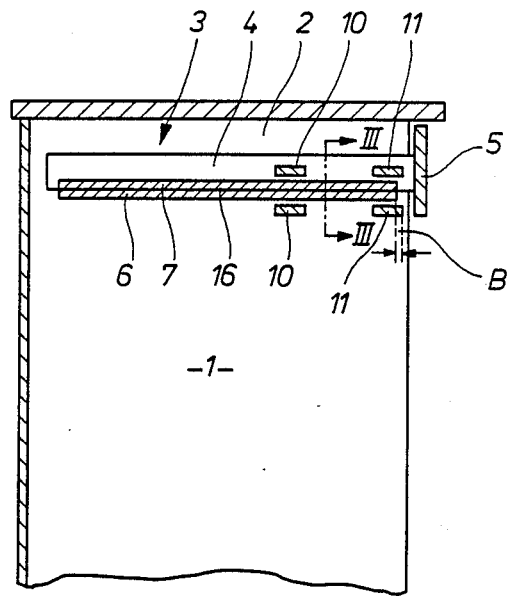
FIG. 1 is a diagrammatic, fragmentary longitudinal section through a piece of furniture comprising a body or casing, and a sliding drawer, and incorporating a magnetic guide system embodying the invention, with the drawer being shown in its closed position.
Figure 2:
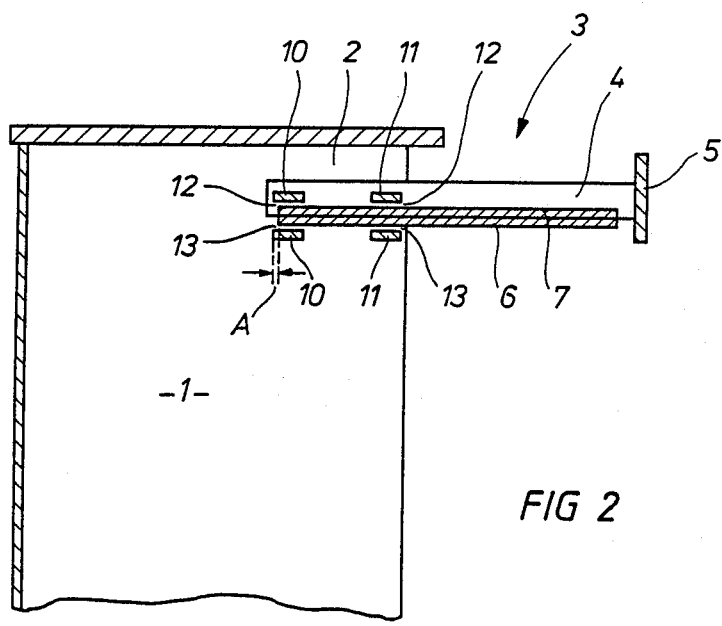
FIG. 2 shows the piece of furniture of FIG. 1 with the drawer open.

FIGS. 1 and 2 show a piece of furniture 1 comprising a body or casing 2, in which is slidably mounted a drawer 3. The drawer 3 is shown closed in FIG. 1 and open in FIG. 2.

These Figures also show a drawer runner or rail 4 and the facing or front panel 5 of the drawer 3. The drawer rail 4 has a limb or branch 16 carrying permanent magnets which form lower and upper magnetic tracks 6 and 7 respectively, and move longitudinally with the drawer.

Further permanent magnets are provided, mounted on the furniture casing 2, via a mounting rail (not shown in FIGS. 1 and 2), in such manner that the drawer 3 is always maintained in a suspended or floating condition, i.e. in its closed and opened positions, as well as intermediate positions. The latter permanent magnets are installed in the front section of the casing 2, and comprise bearing magnets 10, 11 of relatively short length, which are positioned vertically opposite one another in pairs. The bearing magnets 10, 11 may alternatively be distributed differently on the mounting rail, for example other supplemental bearing magnets may be incorporated if the drawer 3 is to be subjected to greater loads.

Figure 3:
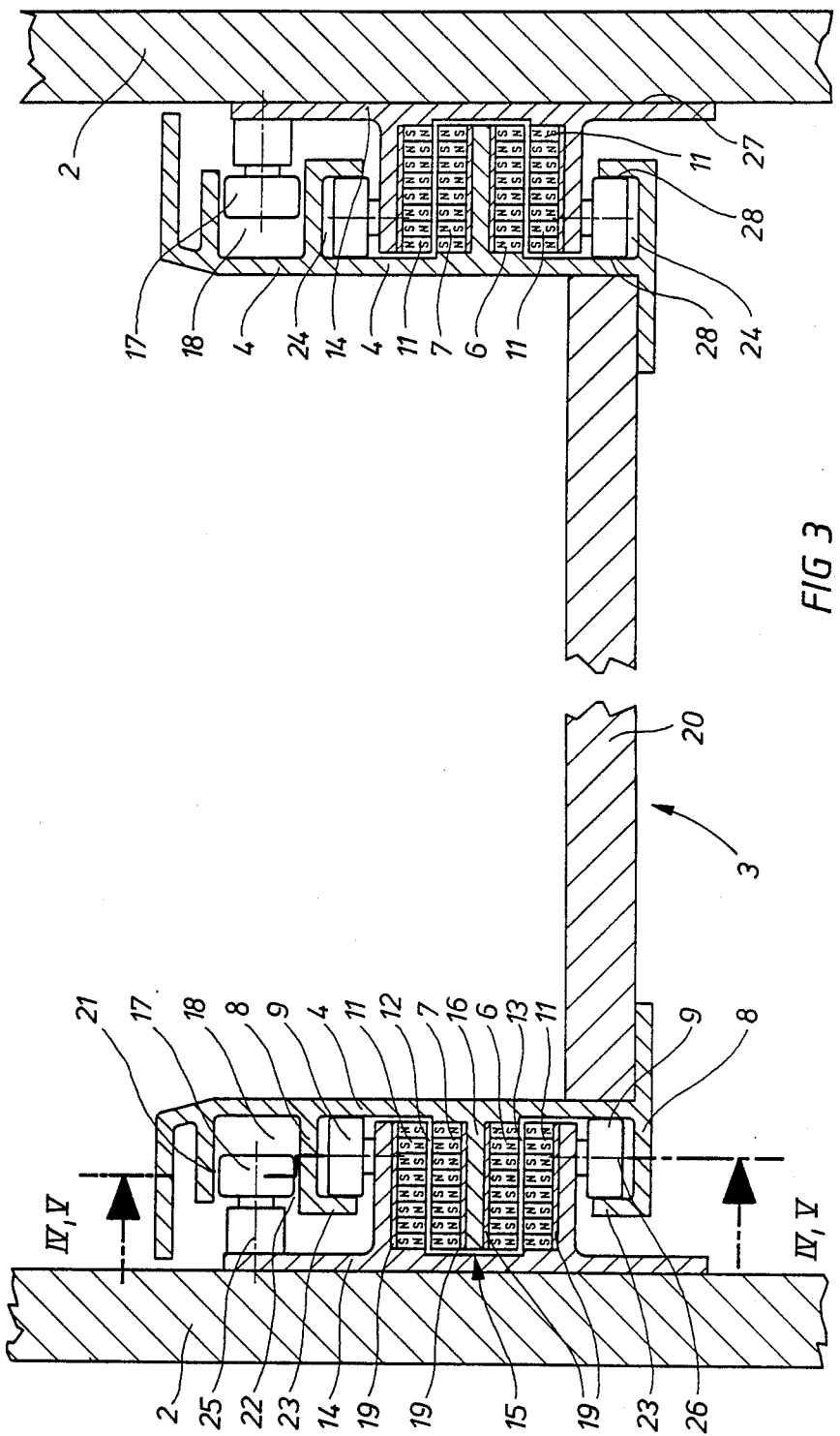
FIG. 3 is a fragmentary transverse section, on an enlarged scale and in greater detail, through the drawer and adjacent parts of the body, along the line III—III in FIG. 1.

FIG. 3 shows a more detailed and enlarged cross-section view of the drawer 3 installed within the furniture casing 2.

Each drawer rail 4 engages and supports the drawer base 20 and inter-engages with the mounting rail 14. The mounting rail 14 is secured to the interior of the upright side wall of the casing 2 in a manner which is not illustrated, a clearance 27 being provided between the mounting rail 14 and the casing side wall to allow for lateral take-up or adjustment.

The mounting rail 14 has a laterally inwardly opening U-shaped recess or channel 15, within which upper and lower sets of bearing magnets 11 are installed on soft iron or mild steel pole pieces or plates 19 on the top and bottom side walls of the channel 15 as shown in FIG. 3. The bearing magnets 11 are formed by discrete strip-like magnets of alternate polarity placed side-by-side.

Projecting laterally outwardly from the drawer rail 4 is a horizontal limb 16 which projects into the U-shaped channel 15 of the mounting rail 14. Lower and upper strip-like magnetic tracks 6, 7 (see also FIGS. 1 and 2) are situated respectively below and above the limb 16, also with the interposition of pole pieces or plates 19.

The drawer 3 is suspended in a floating condition via air gaps 12, 13 provided between the bearing magnets 11 of the mounting rail 14 and the magnetic tracks 6, 7 on the limb 16 of the drawer rail 4, because the bearing magnets 10, 11 confront magnetic tracks 6, 7 of like polarity, so that the magnetic systems repel one another.

The polarities of the bearing or mounting rail magnets 10, 11 and oppositely directed magnetic drawer rail tracks 6, 7 in FIGS. 1 to 3 are arranged so that the poles of like polarity face towards and overlie each other, thereby repelling each other and maintaining the drawer 3 in a floating condition.

To prevent the drawer 3 from escaping sideways from the repelling magnetic forces, the drawer rail 4 is provided with tracks or rails 8 in the form of downwardly and upwardly opening U-shaped channels respectively above and below the magnetic system. Each track 8 has a vertical side wall 23 which enflanks associated guide rollers 9 which extend from the mounting rail 14 and are journalled on associated vertical shafts 26.

The guide rollers 9 are installed with minimal lateral clearances 28 within the tracks 8. As will be apparent from FIGS. 3 to 5, the guide rollers 9 are largely free of load, because the drawer is merely prevented from undergoing lateral deviation, and is otherwise maintained in its floating condition by the magnetic system.

A clearance 24 is deliberately provided in a vertical direction between the guide rollers 9 and the track 8 to accommodate vertical fluctuations of the drawer 3 under load.

Furthermore, overload rollers 17 carried by the mounting rail 4 engage in a laterally outwardly opening U-shaped channel or track 18 in the drawer rail 4 as shown in FIGS. 3 to 5. The overload rollers are rotatably journalled on horizontal shafts 25. Clearances 21, 22 exist between the overload rollers 17 and the upper and lower side walls of the support channel 18 when the drawer is subjected to normal load conditions, and the overload rollers 17 consequently extend within the support channel 18 without contact.

However, if the drawer 3 is subjected to an overload, the overload rollers 17 support the drawer via the upper side wall of the support channel 18, thereby preventing frictional engagement between the permanent magnets, and in particular bottoming of the magnetic track 6 on the lower bearing magnets 10, 11. Thus, the operation of the drawer when pushed in or pulled out is not put at risk under overload conditions.

The relative positions of the bearing magnets 10, 11 and magnetic tracks 6, 7 of the magnetic system are illustrated in FIGS. 2 and 4 when the drawer 3 is pulled out. It will be seen that the rear ends of the magnetic tracks 6, 7 are longitudinally offset or asymmetrical relative to the bearing magnets 10 and the rear of the drawer 3 so that a spacing A is formed. A supplemental repelling force in the direction of the arrow 29 (FIG. 4) is generated in the longitudinal opening direction of the drawer 3 because of this asymmetrical magnet arrangement, so that the drawer 3 advantageously moves out automatically into the fully withdrawn position upon reaching the terminal position.

The bearing magnets 10, 11 associated with the drawer rail 14 are of relatively short length as will be apparent from FIGS. 4 and 5. As will be apparent from FIG. 3, the discrete magnets are set close to each other in strips of alternating polarity, so that short magnetic tracks are formed which confront one another. In this respect, the length of the bearing magnets 10, 11 depends on the estimated loading to which the drawer 3 is normally expected to be subjected.

The permanent magnets 6, 7 associated with the drawer rail 4 are formed as a magnetic track as shown in FIG. 4, and are also set facing one another, on the soft iron pole plates 19 which advantageously short the force field of the magnets and prevent diffusion of the magnetic fields. The drawer rail 4 is advantageously produced from a non-magnetic material, e.g. aluminium.

The permanent magnets are advantageously produced from elongated strips of a plastics material with ferromagnetic particles embedded therein, the particles being alternately polarised in strips.

Apart from the permanent magnets or bearing magnets 10, 11 and magnetic tracks 6, 7 which provide vertically directed thrust, load-bearing and/or guiding forces, other permanent magnets having horizontally directed load-bearing or guiding forces may additionally be provided. In this respect, these supplemental magnets may be provided in particular in the lateral section between the mounting rail and the drawer rail, and may act in a horizontal direction, in particular in the manner of repelling forces, to replace the guide rollers 9 shown in FIGS. 3 to 5. Instead of the guide rollers 9, magnetic systems may be incorporated for this purpose, which face towards on another, extend longitudinally beside the drawer, and repel one another, so that the drawer 3 is also held in a floating condition in lateral directions.

The drawer 3 is illustrated in the pushed-in condition in FIGS. 1 and 5. In this condition the magnetic tracks 6, 7 are longitudinally offset or asymmetrical relative to the bearing magnets 11 at the front of the drawer 3, so that spacing B is formed. A closing force in the longitudinal direction of the drawer 3 occurs in the direction of the arrow 30 (FIG. 5) due to the repulsion between the magnets because of their asymmetrical positioning. In this way, the drawer 3 is advantageously automatically drawn in upon being pushed in and upon reaching the terminal position, and is held in the retracted condition by the specific holding force in the direction of the arrow 30.

In the embodiment shown in FIG. 3, each guide roller 9 is a close fit between both side walls of the channel-shaped track 8. In the embodiment shown in plan in FIG. 6, three guide rollers 9 are provided, mutually offset within the track 8. Two of the guide rollers 9 contact the outer vertical side wall 23 of the track 8 and the other guide roller 9 contacts the other side wall formed by the vertical limb of the drawer rail 4. A minimum amount of clearance between the guide rollers and the track 8 is thus obtained in this manner, in which respect and with reference to FIG. 3, the bearing magnets 11 can be maintained with their polarity set precisely opposite to the opposed polarity of the magnetic tracks 6, 7. A maximum degree of efficiency of the magnetic system is thus obtained, with respect to the load-bearing force and the floating arrangement of the drawer 3.

The operation of the magnetic guide system for drawers, in particular under load, will now be described.

The continuous magnetic tracks 6, 7 shown in FIGS. 1 to 5 are held in a floating condition within the two air gaps 12, 13 by virtue of the mutually repelling poles of like polarity of the bearing magnets 10, 11. In this respect, the drawer 3 is located laterally only in the area of the track 8 which engages on the guide rollers 9 projecting from the mounting rail 14.

An increase in the size of the upper gap 12 results from an increased load being applied to the drawer 3, and this leads to a substantial reduction in the repelling forces acting between the upper bearing magnets 10, 11 and magnetic track 7.

A corresponding reduction in the size of the lower gap 13 consequently occurs which results in an increase in the repelling forces acting between the lower bearing magnets 10, 11 and magnetic track 6. A balance is thus re-established by variation of the vertical width of the gap, so that the drawer 3 remains in the floating or suspended condition, even under load.

The overload rollers 17 are only loaded under overload condition, the upper side wall of the support channel 18 then resting on the overload rollers 17. The overload rollers 17 merely act as a safety device to prevent mutual contact between the surfaces of the magnetic track 6 and the lower bearing magnet 11.

The forces which assist in opening or closing the drawer are caused by the asymmetrical magnetic arrangement of the magnetic tracks 6, 7 relative to the bearing magnets 10, 11 at the terminal positions, thereby generating additional repelling forces in the longitudinal directions of the arrows 29, 30, which respectively assist insertion and withdrawal of the drawer 3.

The drawer 3 is guided laterally only by the guide rollers 9. The guide rollers 9 accommodate any vertical deflections of the drawer 3 within the track 8 without impairing the suspended condition of the drawer 3.

Conventional guide rollers are eliminated in this manner due to the principle of magnetic repulsion, or if such guiding rollers are utilised, these are relieved of load to the extent of the repulsive magnetic force, thereby improving the ease of running and quiet operation of the drawer 3.

Figure 7:
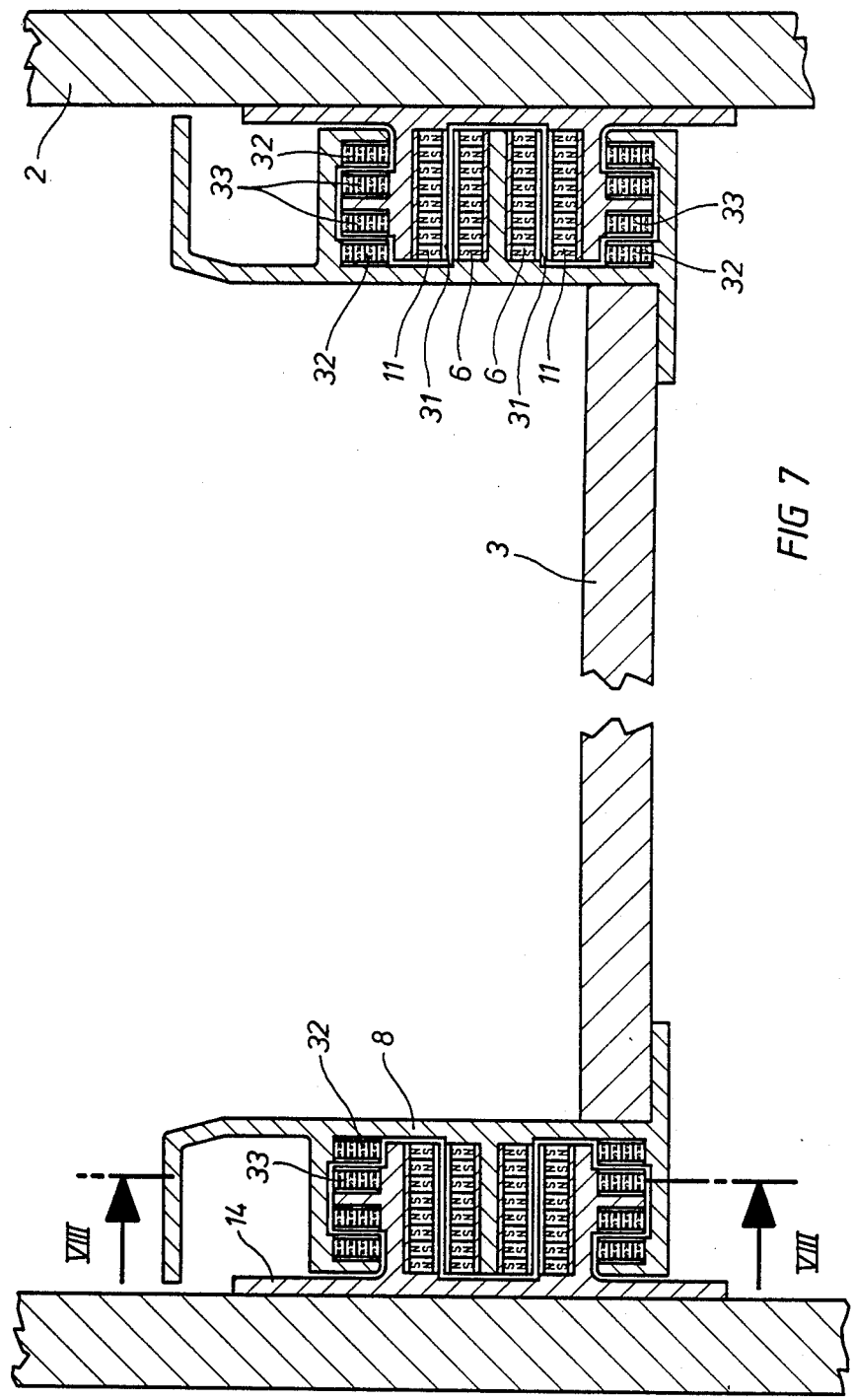
FIG. 7 is a fragmentary transverse section through another embodiment, showing a drawer associated with mutually opposed magnetic tracks which serve as lateral guide means.
Figure 8:
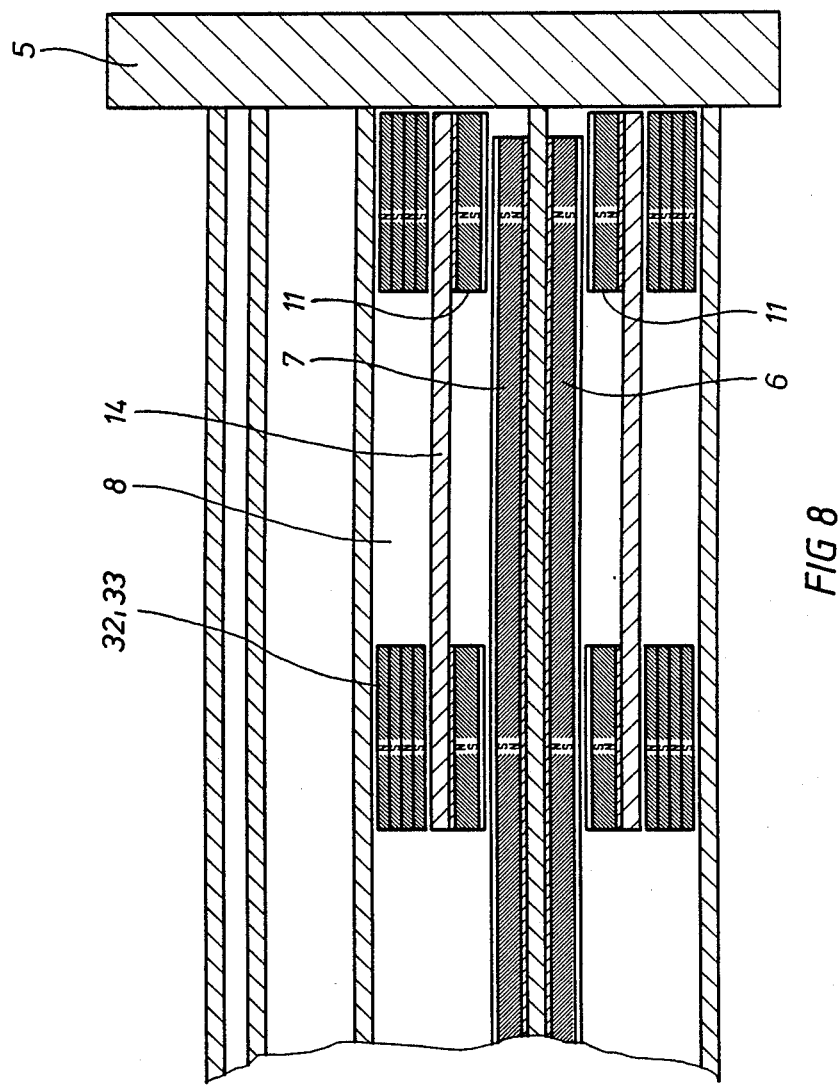
FIG. 8 is a fragmentary longitudinal section along the line VIII—VIII in FIG. 7.

FIGS. 7 and 8 show another embodiment of a drawer guiding system differing from the embodiment previously in that the guide rollers 9 are replaced by mutually opposed and mutually repelling magnetic tracks 32, 33, carried by the drawer 3 and the casing 2 of the piece of furniture respectively, for lateral or horizontally guiding the drawer 3.

It will also be apparent from FIGS. 7 and 8 that anti-friction coatings 31 are applied on the tracks between the magnets to serve as emergency bearing surfaces for the load-transmitting permanent magnets 6, 11.

This anti-friction coating may consist of a PTFE (e.g. Teflon) coating or of different anti-friction varnish compositions. An anti-friction foil could alternately be applied.

Figure 9:
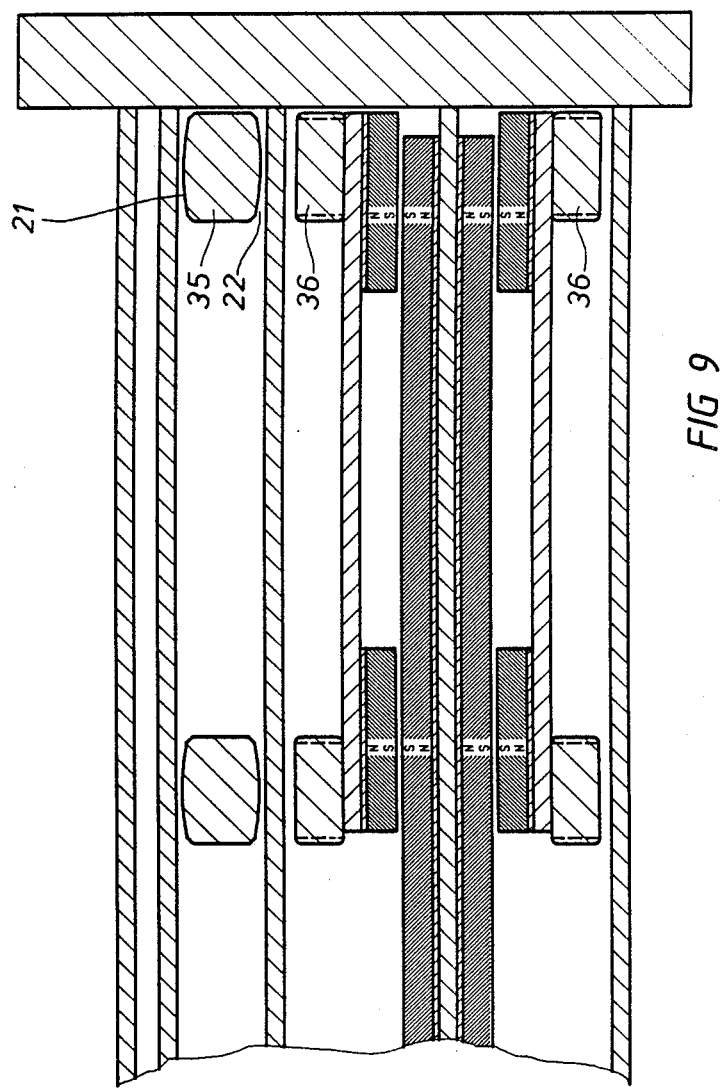
FIG. 9 is a fragmentary longitudinal section along the line IX—IX in FIG. 10, through another embodiment of drawer guide system incorporating anti-friction guide means which serve as a safety measure when the drawer is overloaded and also serve to laterally guide the drawer.
Figure 10:
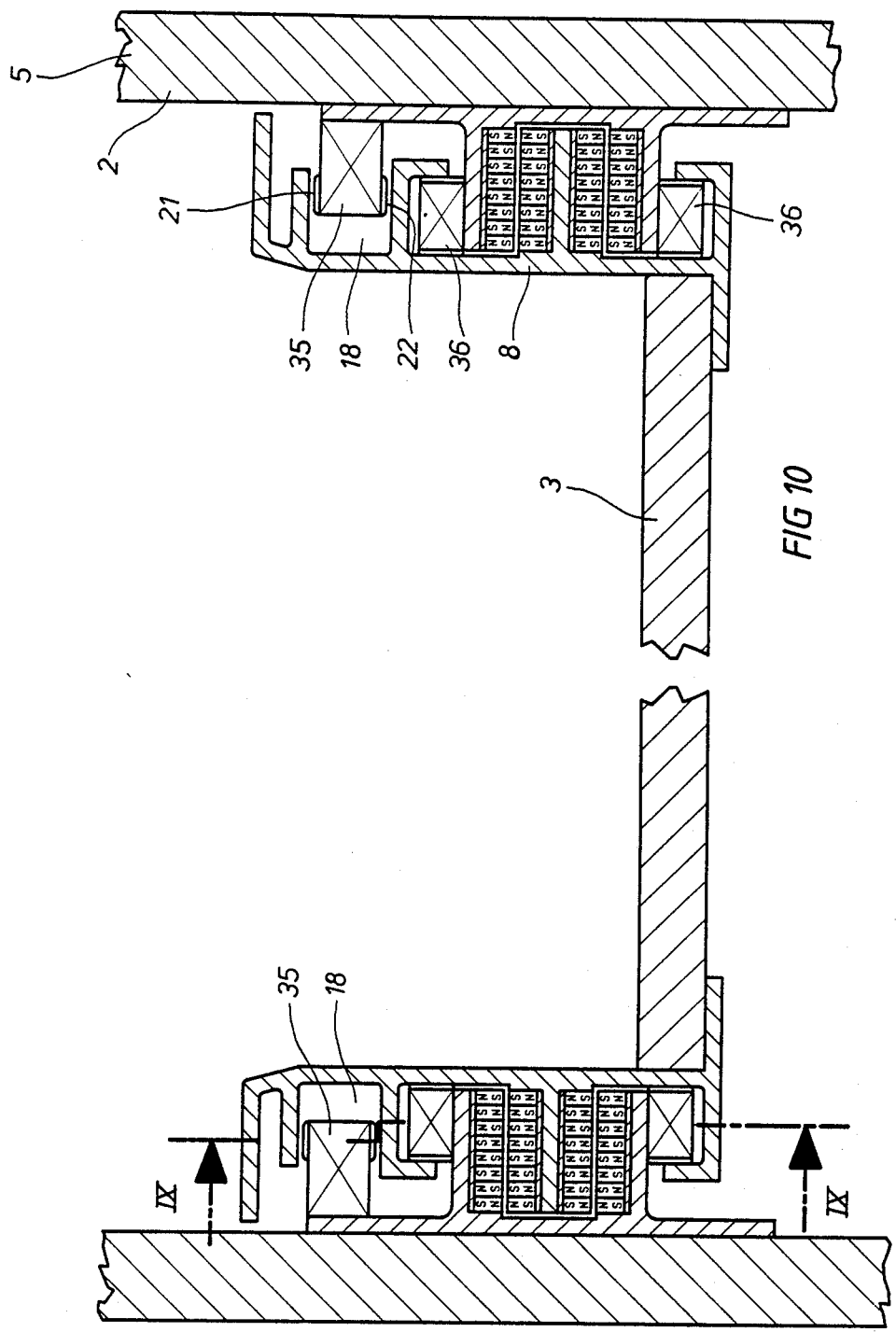
FIG. 10 is a fragmentary transverse section through the drawer and adjacent parts of the body shown in FIG. 9.

FIGS. 9 and 10, show another embodiment in which the lateral guiding of the drawer 3 with respect to the casing 2 of the piece of furniture is achieved by anti-friction guide means 36. The anti-friction guide means 36 are mounted on the mounting guide rail of the casing 2 and comprise anti-friction elements which co-operate, with a minimum of clearance, with the track guide rail 8 of the drawer rail.

In addition, in this embodiment, overload sliders 35 are provided as a safety precaution against overload. These overload sliders 35 are installed on attachments to the mounting guide rail 14, which co-operate with the associated stops on the drawer guide rail 4.

It will be self-evident that the guide systems applicable to the body of the piece of furniture 2, and to the drawer may be changed over in all the embodiments herein described, i.e. the mounting rail may be installed on the drawer in place of the drawer rail and the drawer rail may conversely be installed on the piece of furniture.

Figure 11:
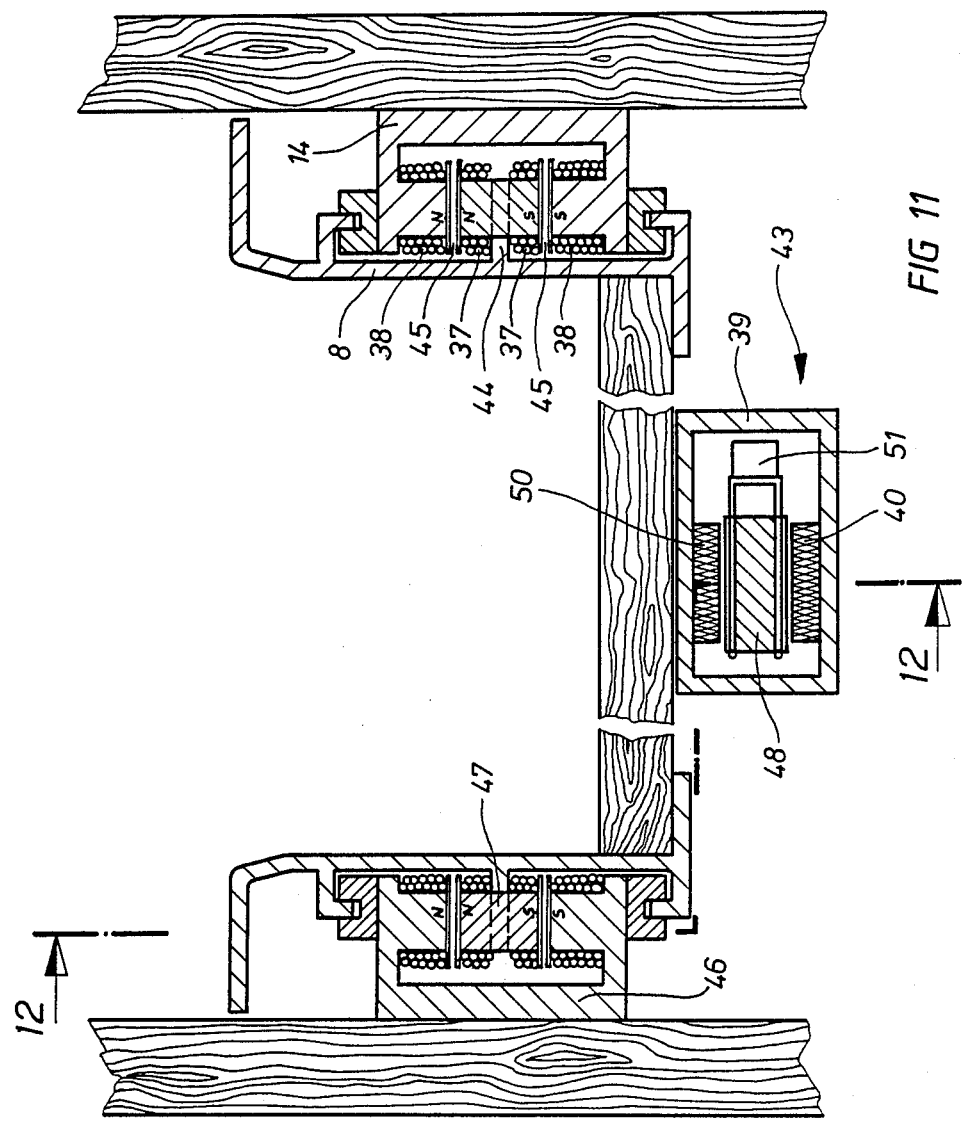
FIG. 11 is a fragmentary transverse section through another embodiment of a load-transmitting magnetic system, utilising electromagnets.
Figure 12:
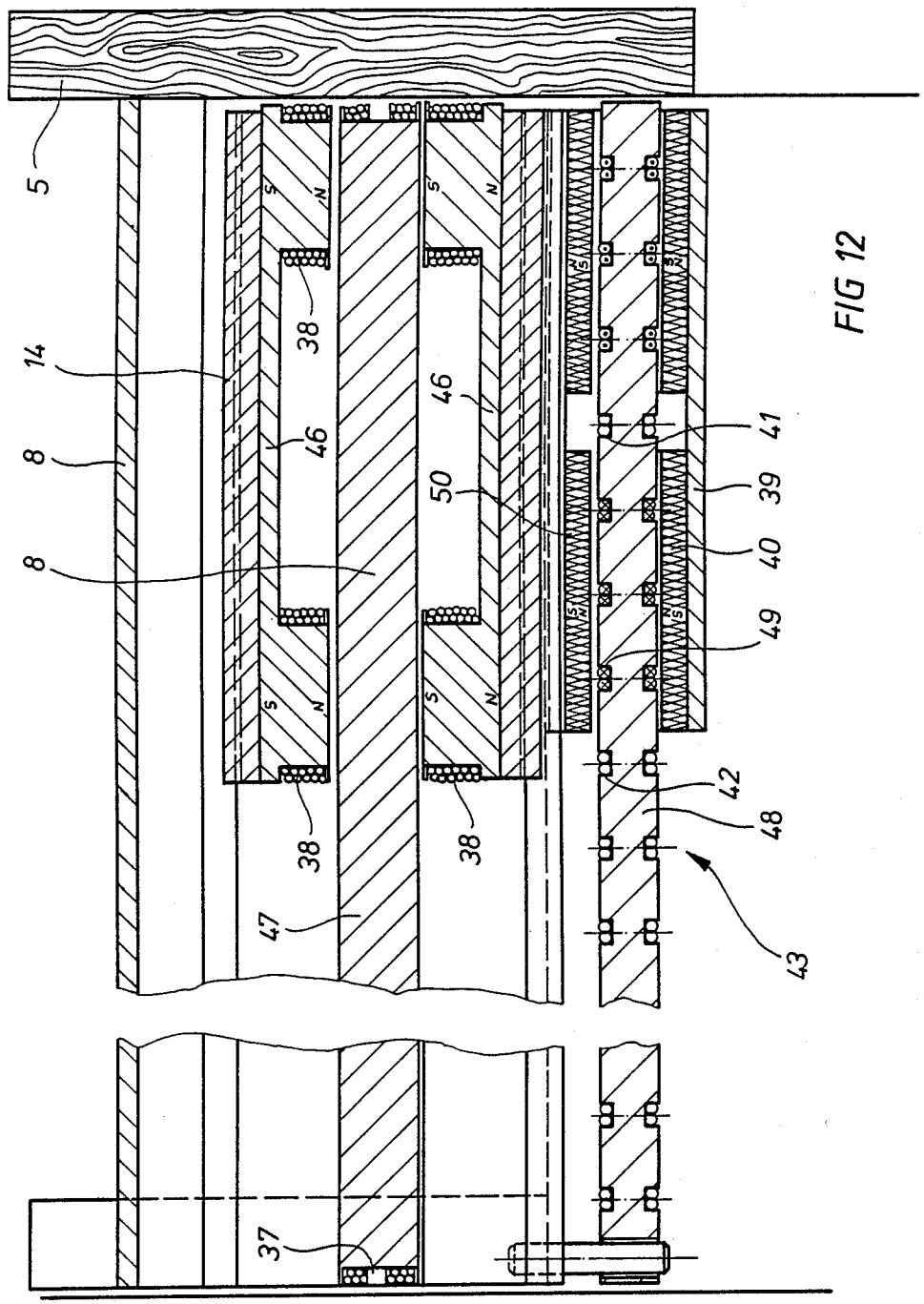
FIG. 12 is a longitudinal section along the line XII—XII in FIG. 11.

FIGS. 11 and 12 serve to demonstrate that, in all of the previous embodiments, the permanent magnets may be replaced by electromagnets.

FIGS. 11 and 12 show a system of electromagnets in which an electromagnet 37 is installed on the drawer-mounted guide rail 4. The electromagnet 37 in the vertical direction, defines poles of opposed polarity, the electromagnet being installed on an associated insert 44 associated with drawer-mounted guide rail 4.

Electromagnets 38 are installed on similar attachments on the casing-mounted guide rail 14 opposite the poles of the electromagnet 37, so that a repelling action in the location of the gaps 45 will again be obtained by the mutually opposed electromagnets 37, 38. The required load transfer or transmission from the drawer to its casing is thus provided by the electromagnets.

Appropriate permanent magnets or electromagnets may also be provided complementarily in this system for the purpose of lateral guiding.

It will also be self-evident that all the load-transmitting magnets and lateral guiding magnets may be constructed as electromagnets in the previously described embodiments of FIGS. 1 to 10.

In FIG. 12, the corresponding mutually opposed electromagnets are shown joined together by a casing-mounted yoke 46, whereas drawer-mounted electromagnets 37 are wound onto an iron core 47 extending throughout the length of the drawer.

FIGS. 11 and 12 also show how withdrawal and insertion of the drawer may be obtained by appropriate servo-drive devices acting between the piece of furniture 2 and the drawer 3. In this respect, a servo-drive, utilising a linear motor 43, is employed.

The linear motor comprises a magnet yoke 39 within which is situated a rotor or armature 48. The armature is wound with a coil from windings 49 arranged obliquely with respect to each other in a manner known per se, the windings being provided with corresponding d.c. connectors 41, 42. The direction of current flow through these windings 49 is indicated in FIG. 12.

Permanent magnets 40, 50 are positioned opposite to the armature 48.

A flow of direct current through the windings 49 generates a force in a direction oblique to the direction of withdrawal or insertion, thereby obtaining, for example, the required withdrawing displacement of the drawer.

A reversal of the polarity of the winding will therefore generate a force in the opposite direction.

A sliding contact 51 serves to supply current to the windings 49.

It will be understood that various modifications may be made without departing from the spirit and scope of the invention as defined in the appended claims. For example, although only mutually opposed and mutually parallel rails or tracks have been described with reference to the previous embodiments, the present invention also encompasses tracks, runners or rails of other kinds, i.e. not only horizontal tracks extending in mutual opposition and having only an uniform parallel spacing between them.

For example it is known that use may be made of tracks extending trapezoidally with respect to one another in cross-section, which between them equally form an uniform gap.

Not only a load transfer in vertical direction, but also a load transfer in lateral direction may be obtained by means of the same magnetic system when applied to such trapezoidal, round or oval tracks.

The drawer may therefore be subjected to vertical guiding action as well as a lateral guiding action with one and the same track.

The invention possesses the advantage that pairs of guide rails are provided, for example a drawer rail and a furniture or mounting rail, which work in co-operation without any mechanical contact therebetween. The drawer may therefore be moved or inserted virtually without friction whilst still obtaining closing or opening forces at the terminal positions.

What is claimed is:

1. A guide system for drawers, comprising a mounting rail for attachment to a piece of furniture; a drawer rail for attachment to a drawer and supported by the mounting rail for translational movement relative thereto, one of said mounting and drawer rails having a recess, and the other of said mounting and drawer rails having at least one limb which projects into said recess; first and second magnet means of like polarity operable to transfer the drawer load from said drawer rail to said mounting rail, said first magnet means being mounted within said recess and said second magnet means being mounted on said limb facing said first magnet means with at least one gap therebetween; and overload means associated with said mounting rail which engages laterally in a support channel associated with said drawer rail with a vertical clearance.

2. A guide system according to claim 1, wherein said overload means comprises a roller.

3. A guide system according to claim 1, wherein said overload means comprises a slider.

4. A suspension and guide system adapted to permit controlled substantially horizontal reciprocatory movement between first and second structures, comprising a telescopic runner assembly including carriage means attachable to the first structure, and bearer means attachable to the second structure and supporting said carriage means for said reciprocatory movement, said carriage means and bearer means having vertical load-bearing means therebetween comprising first and second magnetic tracks respectively extending in the direction of reciprocation with said first track overlying said second track, said first track comprising a plurality of first magnetic tracks of alternating polarity arranged side-by-side and extending in the direction of said reciprocatory movement, and said second magnetic track comprising a plurality of second magnetic tracks of alternating polarity arranged side-by-side and extending in the direction of reciprocatory movement, with like poles of said first and second magnetic tracks being in vertical alignment, whereby the mutual magnetic repulsion between said first and second magnetic tracks maintains said first magnetic track suspended above said second magnetic track with an air gap therebetween, said carriage means and bearer means also having lateral guide means operable to maintain like poles of said first and second magnetic tracks substantially in vertical alignment, said vertical load bearing means comprising third and fourth magnetic tracks spaced vertically from and extending substantially parallel to said first and second magnetic tracks, and fixed to said carriage means and bearer means respectively, said third magnetic track underlying said fourth magnetic track and having the same polarity as said fourth magnetic track, said third magnetic track comprising a plurality of third magnetic tracks of alternating polarity arranged side-by-side and extending in the direction of reciprocatory movement, and said fourth magnetic track comprising a plurality of fourth magnetic tracks of alternating polarity arranged side-by-side and extending in the direction of reciprocatory movement, with like poles of said third and fourth magnetic tracks being in vertical alignment, whereby the mutual magnetic repulsion between said third and fourth magnetic tracks maintains said fourth magnetic track suspended above said third magnetic track with an air gap therebetween; and overload bearing means which cooperate to prevent said magnetic tracks of said vertical load-bearing means from contacting each other upon vertical deflection of said carriage means when subjected to an overload.

5. A suspension and guide means according to claim 4, wherein said overload bearing means comprises permanent magnets.

6. A suspension and guide system according to claim 4, wherein said overload bearing means comprises electromagnets.

7. A suspension and guide system according to claim 4, wherein said overload bearing means comprises friction-reducing surfaces.

8. A suspension and guide system according to claim 4, wherein said overload bearing means comprises a roller.

* * * * *